(No Model.) 2 Sheets—Sheet 1.
R. A. THAYER & E. EVERETT.
OSCILLATING METER.

No. 447,140. Patented Feb. 24, 1891.

Witnesses:
A. V. Groupe.
R. Schleicher.

Inventors:
Russel A. Thayer
& Edward Everett
by their Attorneys
Howson & Howson (No Model.) 2 Sheets—Sheet 2.

R. A. THAYER & E. EVERETT.
OSCILLATING METER.

No. 447,140. Patented Feb. 24, 1891.

Witnesses:
A. V. Groupe.
R. Schleicher.

Inventors:
Russel A. Thayer & Edward Everett
by their Attorneys
Howson & Howson

UNITED STATES PATENT OFFICE.

RUSSEL A. THAYER AND EDWARD EVERETT, OF ALLENTOWN, PENNSYLVANIA.

OSCILLATING METER.

SPECIFICATION forming part of Letters Patent No. 447,140, dated February 24, 1891.

Application filed July 28, 1890. Serial No. 360,209. (No model.)

*To all whom it may concern:*

Be it known that we, RUSSEL A. THAYER and EDWARD EVERETT, both citizens of the United States, and residents of Allentown, Lehigh county, Pennsylvania, have invented certain Improvements in Meters for Steam-Heating Systems, of which the following is a specification.

The object of our invention is to construct an improved meter for use in connection with steam-supply systems.

For some time past it has been common in cities to have what may be termed a "central plant," from which a number of stores, factories, and private dwellings have been supplied with steam for heating and other purposes.

Our invention is particularly adapted to systems for use in heating purposes.

Our meter is placed in the waste-pipe from the heating-coil of the dwelling, &c., so as to register accurately the water of condensation as it passes from the pipes, as we have found that the only accurate method of ascertaining the exact quantity of steam used is by weighing the water of condensation.

Figure 1:
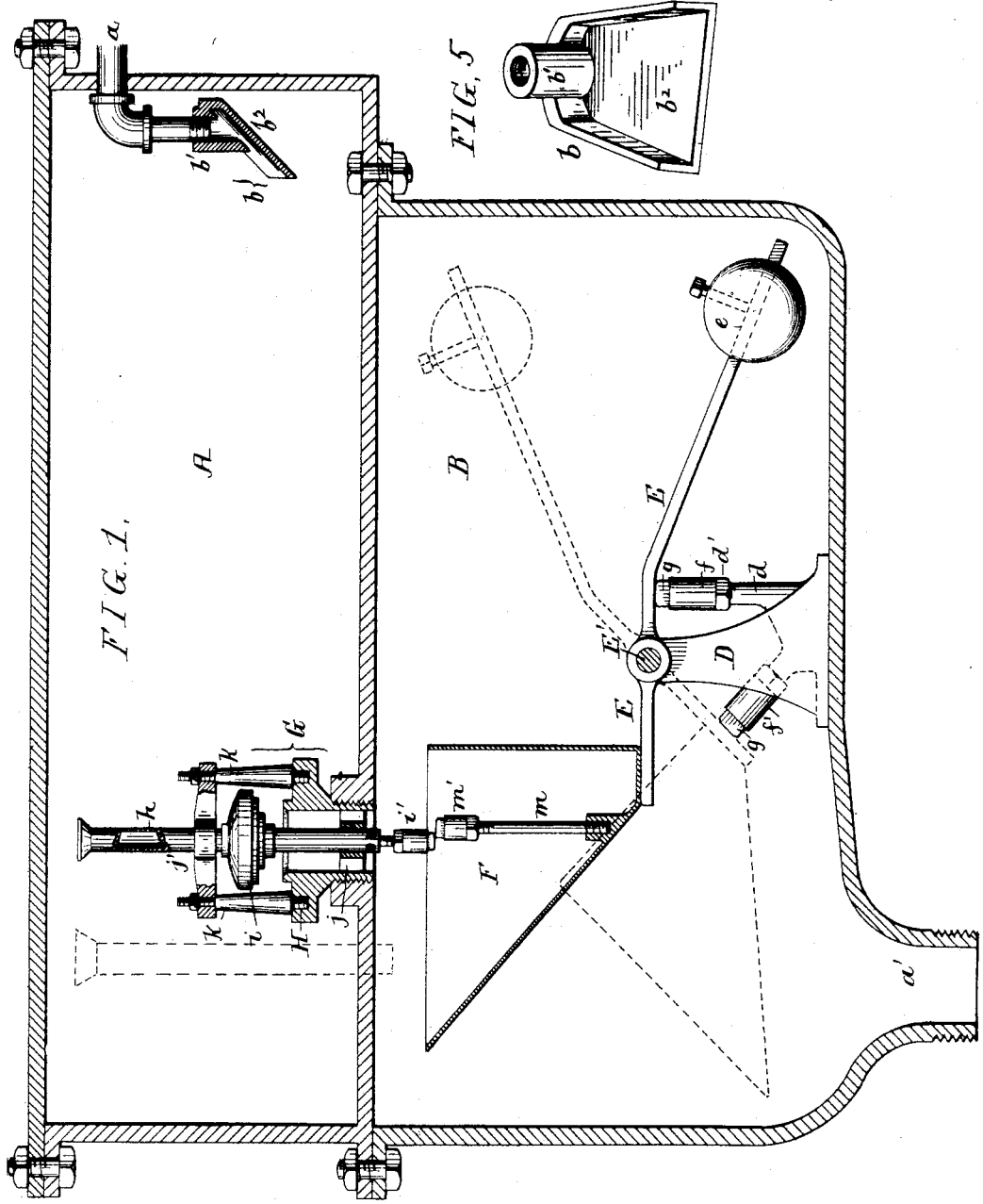
Figure 2:
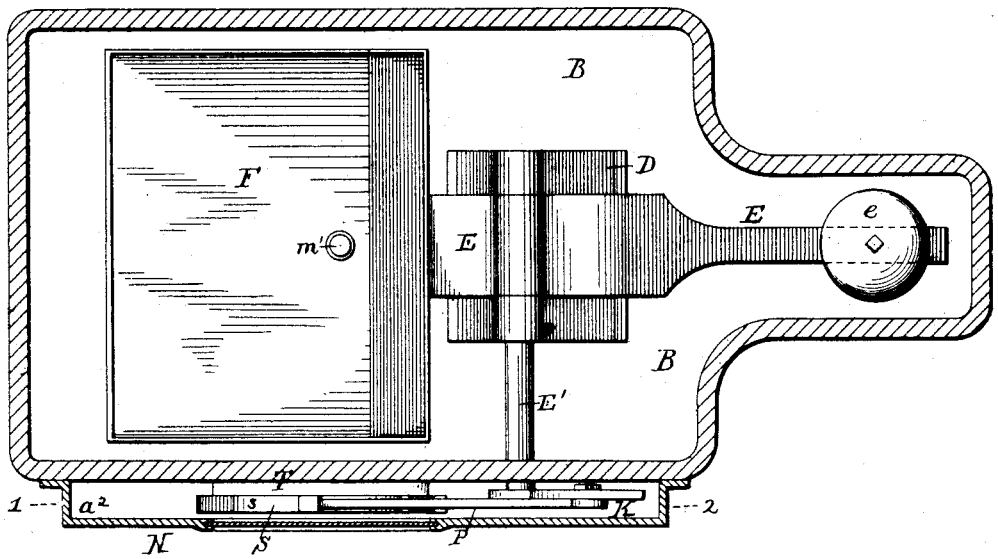
Figure 3:
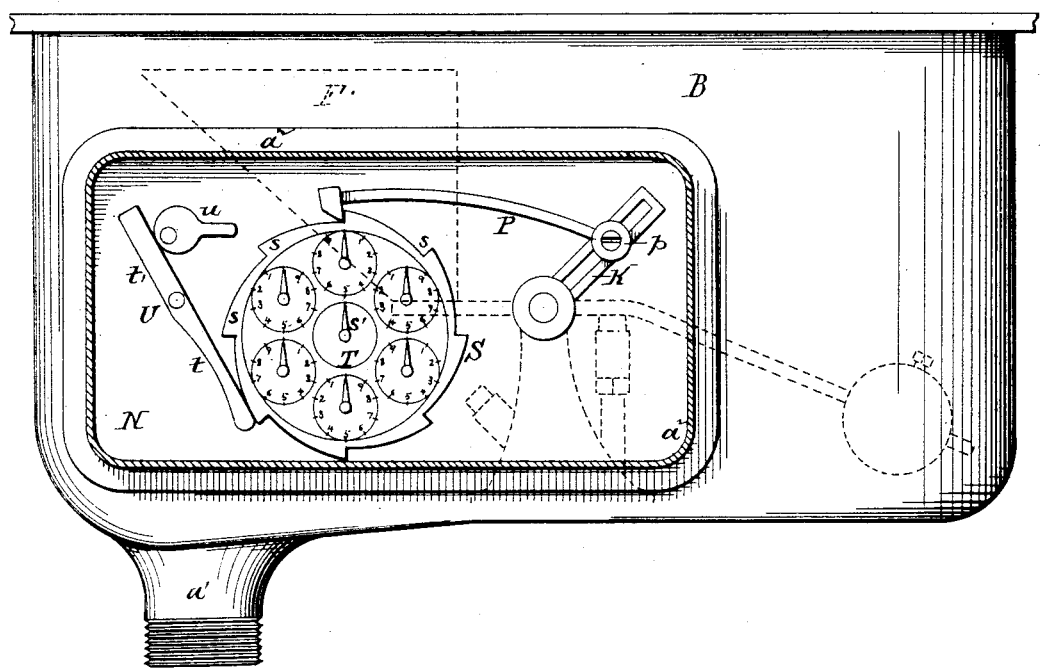

In the accompanying drawings, Figure 1 is a longitudinal section of our improved meter. Fig. 2 is a sectional plan view. Fig. 3 is a side view, partly in section, on the line 1 2, Fig. 2; and Figs. 4 and 5 are perspective views of details of the invention.

A is the receiving-box receiving the water of condensation from the waste-pipe $a$, which is bent as shown in Fig. 1, and attached to its lower end is a spreader-plate $b$, made in the peculiar form shown in Fig. 5, having an extension $b'$, forming the nozzle of the waste-pipe, and having its bottom $b^2$ inclined to allow the water to enter the box in a fine film, so as not to agitate the water in the box. Directly below the box is the weighing-chamber B. Pivoted to bearings D in the chamber is the beam E, having the measuring-vessel F at one end, which is preferably of the form shown in Figs. 1 and 2, and on the opposite end of the beam is an adjustable weight $e$. This weight can be moved upon the beam E, so as to balance the receiving-measure. Stops $f f'$ are mounted on the base of the bearings D, these stops being shown in detail in Fig. 4, having a rubber section $g$, against which strikes the beam, and having an orifice by which it can be screwed onto the projecting stem $d$ of the base. A jam-nut $d'$ is also on this stem in order to securely fasten the stops when adjusted to the position required.

G is the outlet-valve from the chamber A to the measure F. On the beam is a striker which, when the receiving-measure is in the position shown in Fig. 1, supports the valve G, allowing the water to flow into the measure. When the measure is filled, it falls, dumping the water out through the outlet $a'$ and allowing the valve to seat itself, preventing any waste of water until the measure is again in position under the valve.

The valve-stem $h$ of the valve G in the present instance is hollow, so as to allow the overflow to pass away from the receiving-box A into the measure F, and in no case will the overflow pass away from the box A without first being measured, even if the valve proper $i$ adheres to its seat by accident. The stem $h$ is guided in bearings $j j'$, the bearing $j'$ being supported by suitable studs $k k$ from the seat of the valve. The seat of the valve is above the level of the floor of the box, thereby preventing the passage of sediment into the measure below. On the end of the stem $h$ is a bumper $i'$, similar to that shown in Fig. 4, and secured to a standard $m$ is a bumper $m'$, also similar to that shown in Fig. 4, so that when the beam is moved to the position shown in Fig. 1 the bumper $m'$ will strike the bumper $i'$, raising the valve to the position shown in said figure, allowing the water to flow from the chamber A into the chamber B.

The outlet $a'$ of the weighing-chamber B is of a diameter sufficient to prevent the water from backing into said chamber.

In order to register the intermittent dumping of the measure, we provide a register N, Figs. 2 and 3, which is incased in a casing $a^2$ on the weighing-chamber B.

The shaft E', on which the beam E is secured, passes through the casing, and to it is secured a slotted arm K, adjustably attached to which by a set-screw $p$ is a ratchet-lever P, engaging with ratchet-teeth $s$ on the dial-wheel S, which is geared or secured to the hand of the central dial $s'$ of the dial T.

The detail of construction showing the gearing between the central dial and the dials geared thereto need not be described here, as it is the common gearing used in all classes of meters—such, for instance, as those used in connection with gas-meters—merely indicating the number of times the measure has been filled and dumped.

In some cases it might be found necessary to place sufficient friction upon the wheel S to prevent it from turning backward, and we provide a pivoted lever U, having an arm $t$, engaging with the wheel, and another arm $t'$, with which engages a cam $u$. By turning this cam more or less pressure can be applied to the periphery of the wheel, thus preventing it from turning accidentally.

When necessary, the valve-stem $h$ may be solid, in which case the overflow-pipe is placed at one side of the valve, so that the overflow will pass into the weighing-vessel F, as shown by dotted lines.

We claim as our invention—

1. In a meter for registering the water of condensation from a steam system, the combination consisting of a weighing-chamber B, having an outlet $a'$, a receiving-box A directly above the chamber B, an opening forming a communication between the box and chamber, a valve controlling the flow of water through said opening, a stem on said valve with a pivoted lever E, carrying a measuring-vessel F, and a register geared thereto, the whole being so arranged that when the measuring-vessel is in a position to receive water from the box A it supports the valve, substantially as and for the purpose set forth.

2. The combination of the receiving-box, the weighing-chamber, a lever therein, a measuring-vessel carried by said lever, an outlet from the receiving-box directly above the measure, and a valve in said receiving-box acted upon by said measure and controlling the flow of liquid through the outlet, the seat of said valve being above the floor of the box, substantially as set forth.

3. The combination, in a fluid-meter, of the weighing-chamber, the receiving-box, an outlet therefor, a valve controlling said outlet, a stem on said valve extending down into the weighing-chamber, a pivoted lever, a measuring-vessel carried thereby, said vessel being directly under the outlet-opening of the box, and a standard on said lever adapted to act upon and support the valve by its stem, substantially as set forth.

4. The combination, in a meter for measuring the water of condensation from steam-pipes, of the receiving-chamber A, the measuring-chamber B, situated below said chamber A, an outlet for said chamber, a valve in said outlet having a hollow stem forming an overflow-pipe for the said chamber A, a beam pivoted in the chamber B, having a receiving-measure directly under the outlet of the chamber A, and a device for tripping the valve in said outlet, the arrangement being such that the overflow from the chamber A will pass into the measuring-vessel, substantially as described.

5. The combination of the weighing-chamber, a pivoted lever therein, a measuring-vessel and a standard carried by said lever, an adjustable bumper on said standard, a receiving-box above the chamber, an outlet-opening therefrom directly above the measure, a valve therefor, and a stem on said valve having an adjustable bumper acted upon by the bumper carried by the lever, substantially as set forth.

In testimony whereof we have signed our names to this specification in the presence of two subscribing witnesses.

RUSSEL A. THAYER.
    EDWARD EVERETT.

Witnesses:
 EUGENE ELTERICH,
 HENRY HOWSON.